(12) United States Patent
McGee et al.

(10) Patent No.: US 10,794,415 B2
(45) Date of Patent: Oct. 6, 2020

(54) THREADED BLIND FASTENER AND SPACER ASSEMBLY AND METHODS FOR THE ASSEMBLY AND USE THEREOF

(71) Applicant: BOLLHOFF, INC., Kendallville, IN (US)

(72) Inventors: Thomas F. McGee, South Lyon, MI (US); Roger D. Fieldhouse, Auburn, IN (US)

(73) Assignee: Bollhoff Inc., Kendallville, IN (US)

( * ) Notice: Subject to any disclaimer, the term of this patent is extended or adjusted under 35 U.S.C. 154(b) by 1 day.

(21) Appl. No.: 16/023,572

(22) Filed: Jun. 29, 2018

(65) Prior Publication Data

US 2019/0003508 A1    Jan. 3, 2019

Related U.S. Application Data

(60) Provisional application No. 62/527,406, filed on Jun. 30, 2017.

(51) Int. Cl.
| | | |
|---|---|---|
| *F16B 13/04* | (2006.01) | |
| *F16B 19/10* | (2006.01) | |
| *F16B 37/06* | (2006.01) | |
| *B21J 15/04* | (2006.01) | |
| *F16B 5/02* | (2006.01) | |

(52) U.S. Cl.
CPC ........ *F16B 19/1063* (2013.01); *B21J 15/043* (2013.01); *F16B 19/1072* (2013.01); *F16B 37/067* (2013.01); *F16B 5/0233* (2013.01)

(58) Field of Classification Search
CPC .................................................. F16B 19/1072

USPC ................................................. 411/34, 36, 55
See application file for complete search history.

(56) References Cited

U.S. PATENT DOCUMENTS

| | | | | |
|---|---|---|---|---|
| 2,149,199 | A | | 8/1936 | Waner |
| 3,063,329 | A | * | 11/1962 | Vaughn ............... F16B 19/1063 411/28 |
| 3,449,774 | A | * | 6/1969 | Wilham ................. A47K 13/26 4/240 |
| 4,170,920 | A | | 10/1979 | Siebol |
| 4,569,269 | A | * | 2/1986 | Breuer ...................... F41A 3/02 89/24 |
| 5,253,962 | A | * | 10/1993 | Close, Jr. .............. F16B 13/061 411/34 |

(Continued)

FOREIGN PATENT DOCUMENTS

| | | |
|---|---|---|
| GB | 2316457 A | 2/1998 |
| WO | 2011009068 A1 | 1/2011 |
| WO | 2019006302 A1 | 1/2019 |

OTHER PUBLICATIONS

International Search Report and Written Opinion filed in PCT/US2018/040291, dated Nov. 23, 2018.

*Primary Examiner* — Gary W Estremsky
(74) *Attorney, Agent, or Firm* — Renner Kenner Greive Bobak Taylor and Weber

(57) ABSTRACT

A threaded blind fastener and spacer assembly is provided, the assembly including a blind fastener having a flange; and a spacer having a surface, said spacer having a hole therethrough, said hole terminating as a counterbore at said surface, said counterbore receiving said flange. Methods of preparing the assembly and a method of securing the threaded blind fastener and spacer assembly to a substrate material are also provided.

8 Claims, 10 Drawing Sheets

(56) References Cited

U.S. PATENT DOCUMENTS

| | | | | |
|---|---|---|---|---|
| 5,803,686 | A * | 9/1998 | Erbes | G21C 5/10 |
| | | | | 411/55 |
| 5,816,761 | A * | 10/1998 | Cassatt | F16B 19/1063 |
| | | | | 411/34 |
| 6,282,999 | B1 * | 9/2001 | Hite | B25B 13/48 |
| | | | | 411/55 |
| 6,935,821 | B2 * | 8/2005 | Bodin | B25B 27/0007 |
| | | | | 411/29 |
| 7,179,032 | B2 | 2/2007 | Guy | |
| 7,241,097 | B2 * | 7/2007 | Dembowsky | F16B 5/0233 |
| | | | | 411/34 |
| 7,841,816 | B2 * | 11/2010 | Jodeleit | B29C 45/14336 |
| | | | | 411/34 |
| 8,398,345 | B2 * | 3/2013 | Pratt | F16B 13/0858 |
| | | | | 411/34 |
| 8,961,086 | B2 | 2/2015 | Pratt | |
| 9,669,457 | B2 * | 6/2017 | Bigot | B21J 15/043 |
| 2008/0206011 | A1 * | 8/2008 | Wille | F16B 13/061 |
| | | | | 411/34 |
| 2017/0022707 | A1 | 1/2017 | Feldpausch et al. | |

* cited by examiner

THREADED BLIND FASTENER AND SPACER ASSEMBLY AND METHODS FOR THE ASSEMBLY AND USE THEREOF

CROSS-REFERENCE TO RELATED APPLICATION

This application claims the benefits of U.S. Provisional Patent Application No. 62/527,406, filed Jun. 30, 2017, which is incorporated herein by reference.

TECHNICAL FIELD

Generally, the present invention is directed to threaded blind fastener assemblies. Specifically, the present invention is directed to a threaded blind fastener with an attached spacer.

BACKGROUND ART

It is well known in the art to use blind fasteners in various forms to assemble two or more materials to one another and/or as a nut secured to a material for attachment of a mating part with a screw. These fastener devices are easily installed with power equipment and are suitable for automated assembly processes. Commercially available threaded blind fasteners include Rivnut® brand internally threaded rivet nut fasteners, available from Bollhoff, Inc. An internally threaded blind fastener is described in U.S. Pat. No. 2,149,199, wherein the fastener includes a tubular body with a flange at one end. A portion of the tubular body includes internal threads, and a portion of the tubular body is collapsible. The fastener enables attaching a rubber aircraft wing de-icer extrusion to the leading edge of the wing. The threaded blind fastener secures the aluminum wing skin to the inner aluminum spar and then accepts a mating screw to attach the rubber de-icer. These threaded blind fasteners may have a variety of configurations, including closed end, keyed head, ribbed body, hex body, and special head shapes.

In one common form, a threaded blind fastener may include a threaded mating stem that may be welded to a tubular body. As above, the tubular body includes a flange and a collapsible portion. Blind fasteners that include a threaded stem are commercially available, for example from Bollhoff, Inc. under the Rivstud® brand name.

Threaded blind fasteners, including rivet nuts and rivet studs, are well suited for the purpose of joining sheet-like materials to one another, or to join a separate component to sheet-like materials. The tubular body, which includes a collapsible portion, may be inserted through a hole in the one or more materials to be joined, such that the flange rests against the surface of the outermost material, and the collapsible portion of the tubular body is on the opposite (blind) side of the innermost material. A tool is then used to collapse the cylindrical portion against the blind side, forming a bulbed head that secures the materials tightly together between the flange and the bulbed head and prevents removal of the fastener. The completed assembly may then be ready to receive another fastener or nut, as appropriate.

However, problems may arise when a blind fastener is to be used to join multiple components. For example, when an assembly of several components are to be joined, particularly when a spacer, compression limiter, or block of a material of any type is included in the assembly, all components must be properly aligned and then held in place, which is time consuming. And if the pieces are not properly aligned prior to collapsing of the cylindrical portion of the fastener, the connection process must be re-done, and materials are wasted. Therefore, there is a need in the art for component pieces which simplify the assembly process.

SUMMARY OF THE INVENTION

In light of the foregoing, it is a first aspect of the present invention to provide a threaded blind fastener and spacer assembly and methods for the assembly and use thereof.

It is another aspect of the present invention to provide a threaded blind fastener and spacer assembly comprising a blind fastener having a flange; affixed to a spacer having a surface, said spacer having a hole therethrough, said hole terminating as a counterbore at said surface, said counterbore receiving said flange.

It is another aspect of the present invention to provide a method of preparing a threaded blind fastener and spacer assembly, comprising providing a threaded blind fastener having a flange, said flange having an inwardly extending chamfer; providing a spacer having a surface, said spacer having a fastener hole therethrough, said fastener hole having a counterbore at said surface, said counterbore having a sidewall; and inserting said flange into said counterbore; and deforming said sidewall onto said inwardly extending chamfer to secure said spacer to said threaded blind fastener.

Yet another aspect of the present invention is a method of preparing a threaded blind fastener and spacer assembly, providing a stem having a head with an externally threaded shaft extending therefrom; providing a tubular body having a cylindrical portion with an opening extending therethrough, one end of said tubular body having a radially extending flange; providing a spacer having a surface, said spacer having a fastener hole therethrough, said fastener hole having a counterbore at said surface; and inserting said stem into said opening of said cylindrical portion of said tubular body, said shaft extending from said end of said tubular body; affixing said stem to said tubular body form a threaded blind fastener; inserting said stem of said threaded blind fastener into said fastener hole, said counterbore receiving said flange with said shaft extending through said fastener hole; and affixing said spacer to said threaded blind fastener.

Yet another aspect of the present invention is a method of securing a threaded blind fastener and spacer assembly to a substrate material having a hole therethrough, providing a threaded blind fastener and spacer assembly comprising a threaded blind fastener, wherein said threaded blind fastener includes a tubular body and a flange, said flange having a flange diameter, wherein said tubular body includes an internally threaded portion and a collapsible portion, and wherein said flange extends radially from one end of said tubular body; and a spacer affixed to said threaded blind fastener, said spacer having a surface, said spacer having a hole therethrough, said hole terminating as a counterbore at said surface, said counterbore receiving said flange according to any of the precious claims; providing a substrate having a front side and a blind side, and having a hole therethrough, said substrate hole having a substrate hole diameter, wherein said substrate hole diameter is less than said flange diameter; partially inserting said tubular body into said substrate hole, wherein said collapsible portion and said internally threaded portion pass through said substrate hole from said front side to said blind side, but said flange does not; collapsing said collapsible portion to form a bulbed head adjacent to said blind side, so as to secure said substrate between said flange and said bulbed head.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

In one or more embodiments, the threaded blind fastener and spacer assembly of the present invention comprises a threaded blind fastener and a spacer that is connected thereto. In general, the threaded blind fastener has a threaded portion, a collapsible body portion, and a flange. The collapsible body may be substantially tubular. For purposes of this specification, the term "tubular" should be interpreted broadly to generally describe an elongated hollow body, and it should be understood that a cross-sectional view perpendicular to the axis of the elongated body may be circular, hexagonal, or of other geometric shape. The body may or may not have a closed end.

In one or more embodiments, the threaded blind fastener may be described as a blind rivet nut fastener that includes a tubular body portion and a flange. In these embodiments, the tubular body includes a collapsible portion and at least one threaded portion. The threads may be internal or external. In other embodiments, the threaded blind fastener is a blind rivet stud fastener. In these embodiments, the threaded blind fastener may include a threaded mating stem that may be welded or otherwise affixed to a tubular body that includes a flange and a collapsible portion. In some embodiments, the blind threaded fastener may be provided without internal or external threads.

For purposes of this specification, the term "spacer" should be interpreted broadly to include a device or object for holding two members a given distance from each other, or for taking up space. In general, the spacer has a hole therethrough, said hole terminating as a counterbore at one surface. The counterbore may receive the flange.

Figure 1:
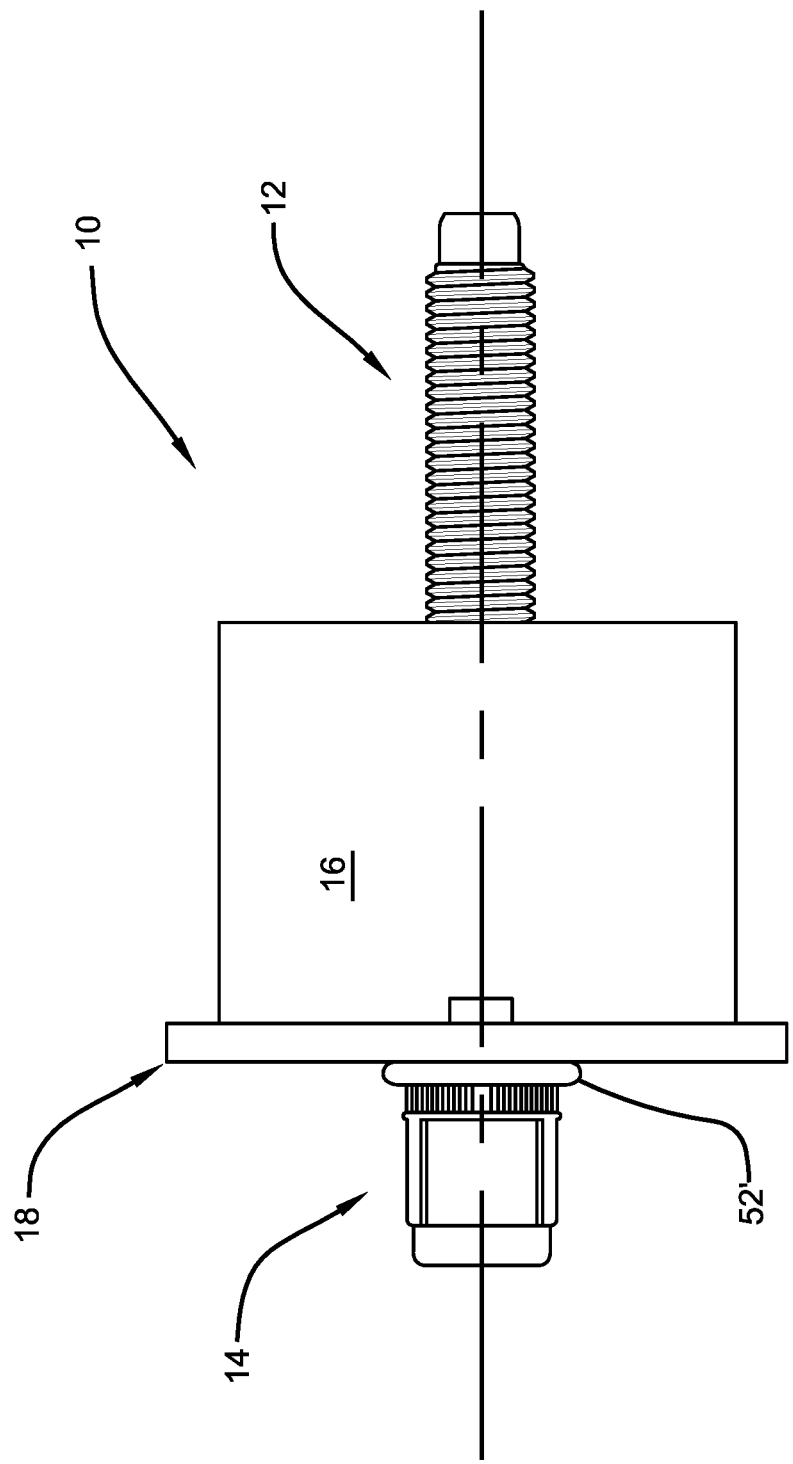
FIG. 1 is a perspective view of a threaded blind fastener and spacer assembly attached to a sheet-like material according to the concepts of the present invention.
Figure 2:
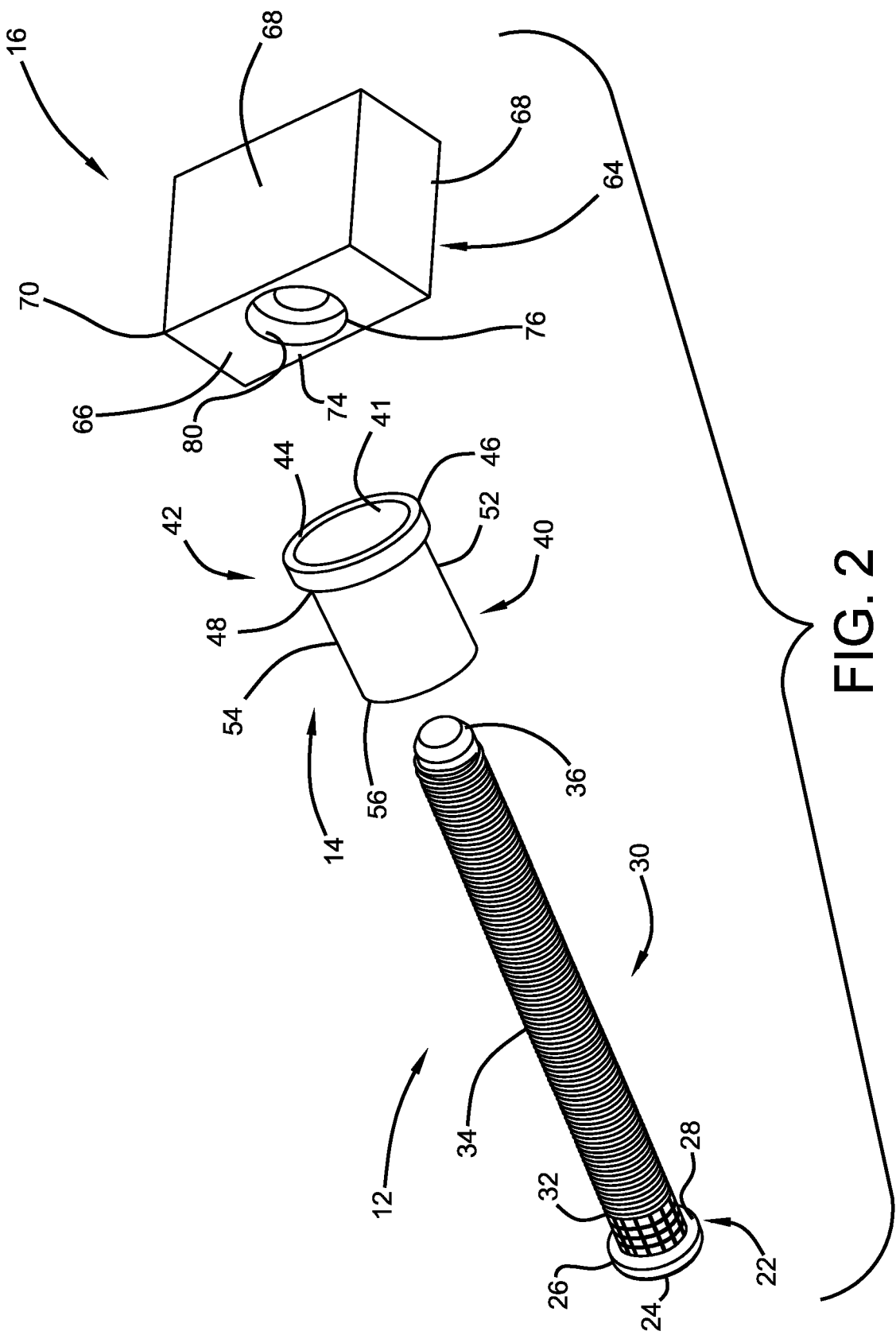
FIG. 2 is an exploded perspective view of a threaded blind fastener and spacer assembly according to the concepts of the present invention.

Referring now to FIGS. 1 and 2, which illustrate an embodiment of the present invention where the threaded blind fastener is a blind rivet stud fastener, it can be seen that a threaded blind fastener and spacer assembly is designated generally by the numeral 10. The assembly 10 may include a stem 12, which may be threaded, and may be referred to as a stud; a tubular body 14, which has been partially collapsed to form bulbed head 52'; and a spacer 16 which is crimped to a flange portion of the tubular body 14. As will be discussed, the assembly 10 is secured to a substrate material 18. For purposes of this specification, the term "substrate material should be interpreted broadly, to include a variety of materials, such as, but not limited to, sheet metals, tubular structures, and plastics. In one or more embodiments, substrate material 18 is a sheet-like material. The sheet-like material may be a metal material such as aluminum, but polymeric materials may also be used. For example, as will be appreciated as the description proceeds, the threaded blind fastener and spacer assembly may be attached to a disc, a gear, a tube, a beam, a drum, a ring or any other structural component which is later positioned adjacent to or attached to some other structural component.

As best seen in FIG. 2, the stem 12 may include a head 22, which may have a flat external surface 24 from which perpendicularly extends an edge 26. Extending perpendicularly from the edge 26 and in a substantially parallel relationship with the external surface 24 is an underside 28. Extending axially from the underside 28 is a shaft 30. The shaft 30 may include a knurl portion 32 which is adjacent the underside 28 and a thread portion 34 which may extend from the knurl portion 32. In some embodiments, a tip 36 may extend axially from the thread portion 34. Skilled artisans will appreciate that the dimensions of the various features of the stem 12 may vary according to a particular end use and compatibility with the components associated with the assembly 10.

Figure 3:
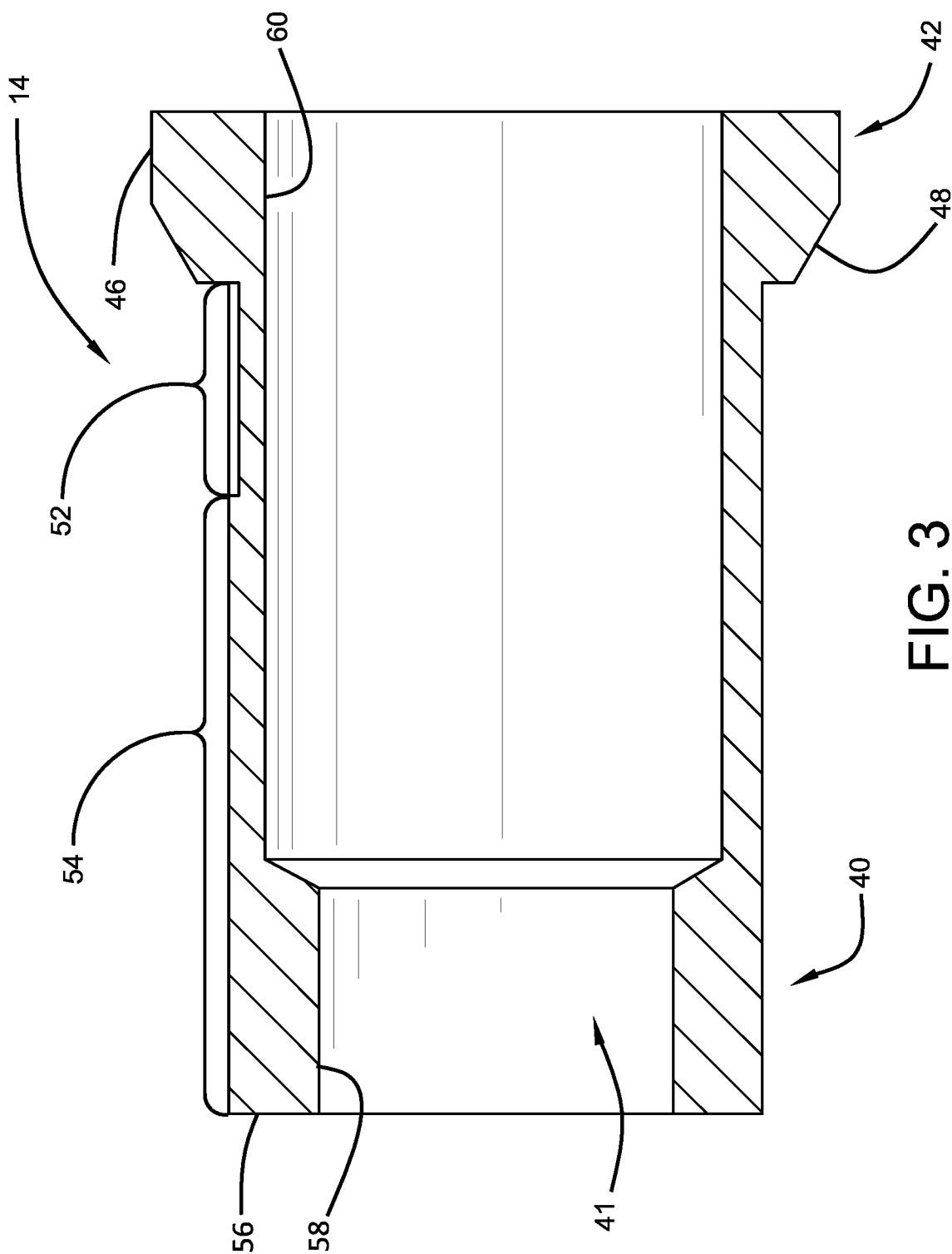
FIG. 3 is a cross-sectional view of a tubular body utilized in the threaded blind fastener and spacer assembly according to the concepts of the present invention.

As best seen in FIGS. 2 and 3, the tubular body 14 includes a cylindrical portion 40 that has an opening 41 extending therethrough. At one end of the cylindrical portion 40 is a flange 42 which extends radially outwardly from the cylindrical portion 40. The flange 42 includes a top surface 44, which may be flat, from which perpendicularly extends an outer edge 46. An inward chamfer 48 extends from the outer edge 46 to the cylindrical portion 40 of tubular body 14. The tubular body 14 includes a collapsible portion 52 which is adjacent the inward chamfer, and in most embodiments the collapsible portion provides a straight knurl on its outer surface. Extending from the collapsible portion 52 is a crimp portion 54. The cylindrical portion 40 and the crimp portion 54 terminate at an end surface 56 which is at the opposite end of the flange 42. The opening 41 has an inner diameter 58 associated with the external crimp portion 54. The opening 41 further extends from the inner diameter 58 to an expanded inner diameter 60 which extends to the flat top surface 44. The expanded inner diameter 60 is associated with the collapsible portion 52 and, as will be appreciated by those skilled in the art, is compatible with a reduced wall thickness of the tubular body in the collapsible portion so as to allow for the tubular body to be collapsed to form a bulbed head as will be discussed. The features of the threaded blind fastener may be of any dimensional size and vary according to a particular end use and compatibility with the other components associated with the assembly 10.

Figure 4:
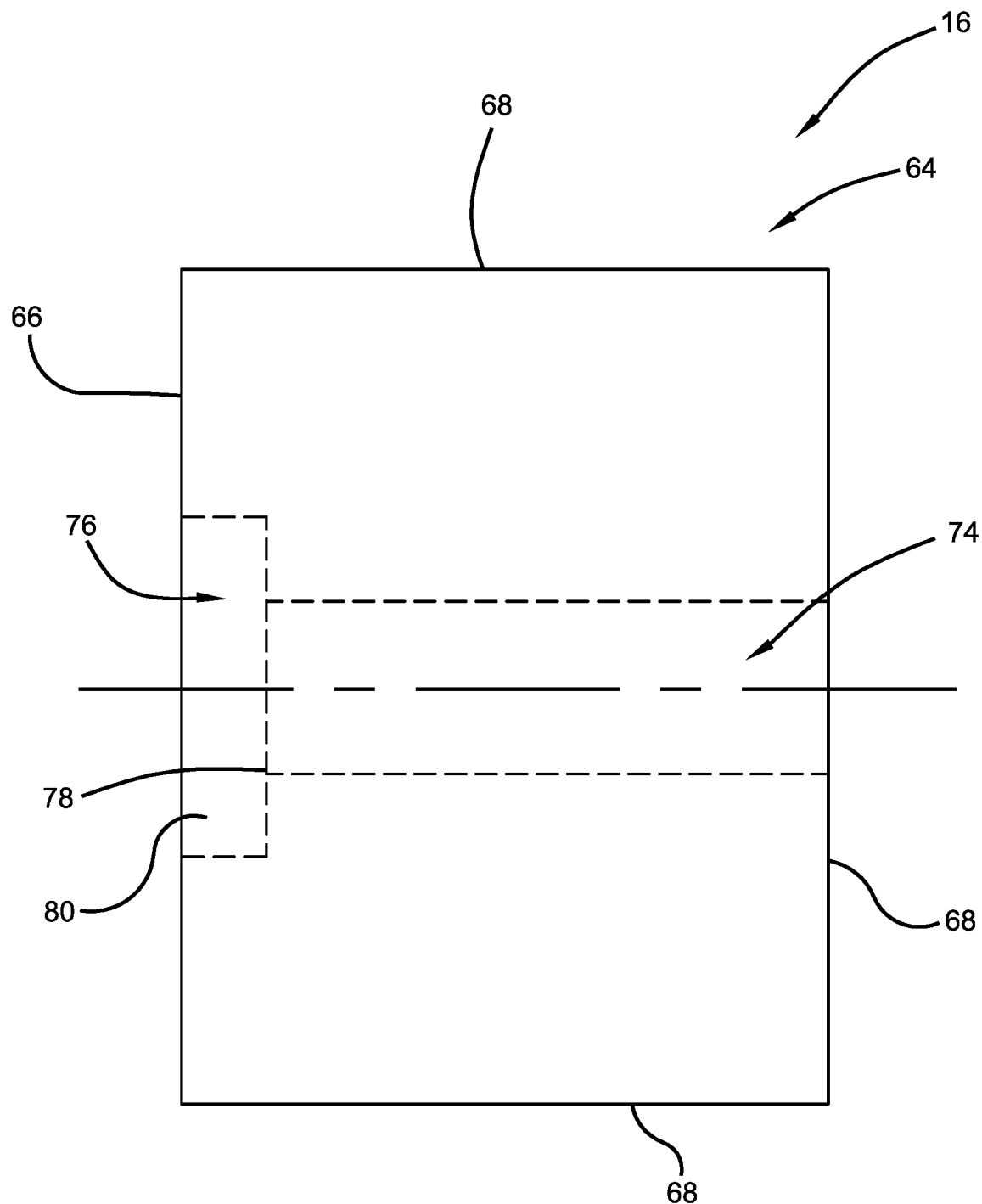
FIG. 4 is a cross-sectional view of an exemplary spacer utilized in the threaded blind fastener and spacer assembly according to the concepts of the present invention.

Generally, as shown in FIGS. 2 and 4, spacer 16 has a hole therethrough, said hole terminating as a counterbore at one surface. The counterbore may receive the flange 42. The figures illustrate embodiments of the invention where spacer 16 includes a block 64. As shown in the drawings, the block is of a rectangular shape, but skilled artisans will appreciate that any size or shape block may be employed. Indeed, the spacer or block may be referred to as a compression limiter which is used to fill a gap or space between a material surface to which the assembly is connected and another surface to which the assembly may be later connected to or provide support to some other component or surface. In other words, the spacer or block may be used to add structure to one component to absorb a load exerted on another adjacent component. In any event, to facilitate the connection with the threaded blind fastener, the block is provided with at least one surface 66, which may be of any contour or shape, which is eventually positioned adjacent the substrate material 18. The block may also include other surfaces 68 which extend from the surface 66. Adjacent the surface 66 and transitioning to the other surfaces 68 is at least one corner edge 70. Extending through the block 64 is a fastener hole 74 which extends from the surface 66 to one of the other surfaces 68. The hole is sized to allow for passage of the shaft 30. Provided on the surface 66 is a counterbore 76 which may be concentrically aligned with the fastener hole 74. The counterbore 76 includes a substantially flat surface 78 which may be substantially parallel with the surface 66 and a side wall 80 which connects the surface 78 to the surface 66. As with the other components of the assembly 10, the spacer 16 and its structural features may be of any dimensional size or shape required by a particular end use and compatibility with the other components.

Advantageously, the threaded blind fastener and spacer assembly of the present invention may be easily assembled, and provides a single fastener component that eliminates process steps, saves time, and avoids alignment issues. The present invention provides a method for preparation of the assembly.

In one or more embodiments, a method of preparing a threaded blind fastener and spacer assembly includes the steps of providing a threaded blind fastener having a flange, said flange having an inwardly extending chamfer; providing a spacer having a surface, said spacer having a fastener hole therethrough, said fastener hole having a counterbore at said surface, said counterbore having a sidewall; and inserting said flange into said counterbore; and deforming said sidewall onto said inwardly extending chamfer to secure said spacer to said threaded blind fastener. In other embodiments, a method of preparing a threaded blind fastener and spacer assembly includes the steps of providing a stem having a head with an externally threaded shaft extending therefrom; providing a tubular body having a cylindrical portion with an opening extending therethrough, one end of said tubular body having a radially extending flange; providing a spacer having a surface, said spacer having a fastener hole therethrough, said fastener hole having a counterbore at said surface; and inserting said stem into said opening of said cylindrical portion of said tubular body, said shaft extending from said end of said tubular body; affixing said stem to said tubular body to form a threaded blind fastener; inserting said stem of said threaded blind fastener into said fastener hole, said counterbore receiving said flange with said shaft extending through said fastener hole; and affixing said spacer to said threaded blind fastener.

Figure 5:
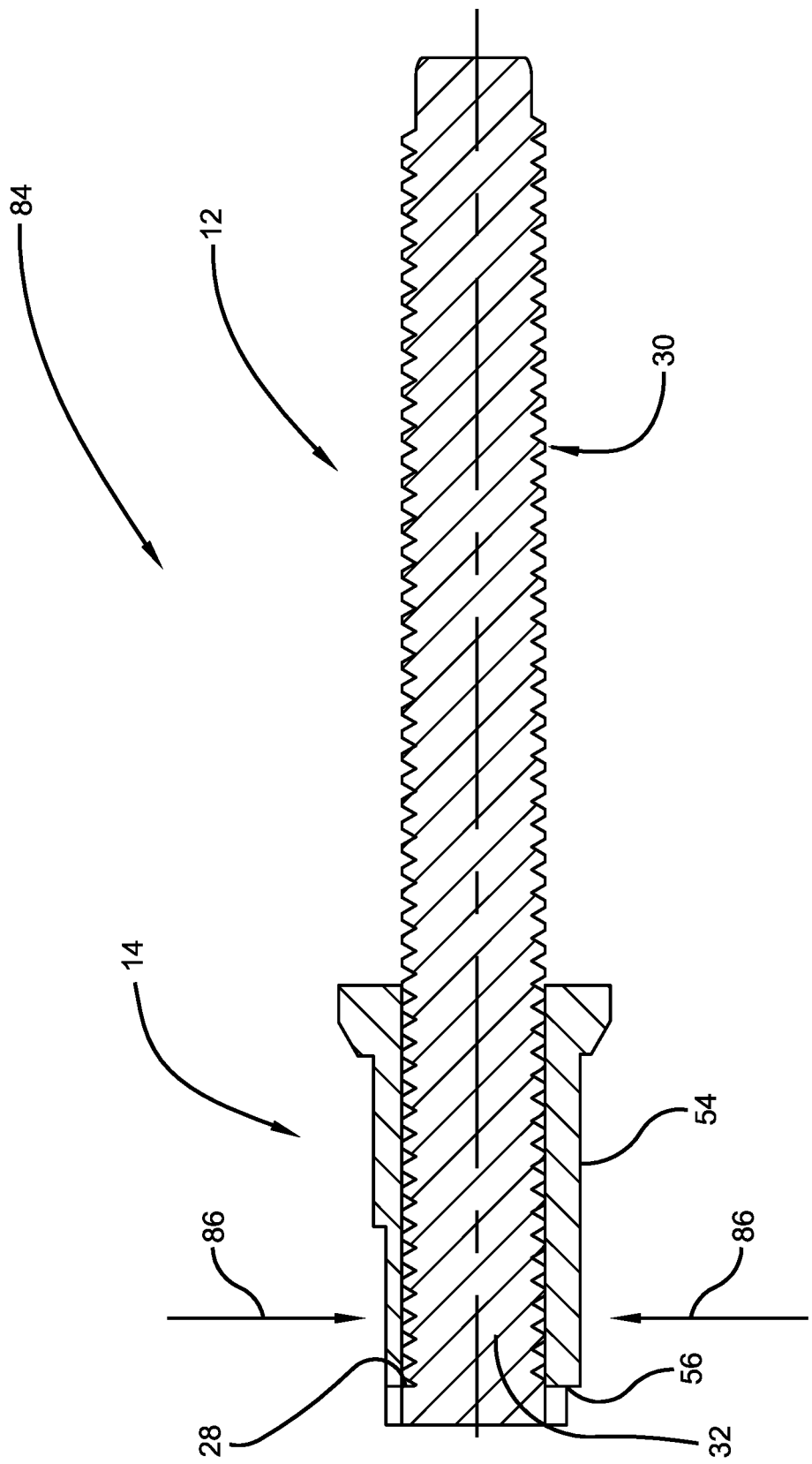
FIG. 5 is cross-sectional view of a stud-rivet sub-assembly utilized in the threaded blind fastener and spacer assembly according to the concepts of the present invention.

In one or more embodiments, as shown in FIG. 5, stem 12 may be inserted into the tubular body 14 so that the underside 28 is adjacent the end surface 56. It will further be appreciated that the crimp portion 54 is positioned over the knurl portion 32 of the shaft 30. Once properly aligned, a crimping force 86 may be applied at or around the crimp portion 54 so as to compress the cylindrical portion 40 in this particular area so as to engage and contact the knurl portion 32 and form a substantial fixed connection between the two pieces. Following this step, a threaded blind fastener sub-assembly 84 may be created—in this case, a blind rivet stud fastener.

Figure 6:
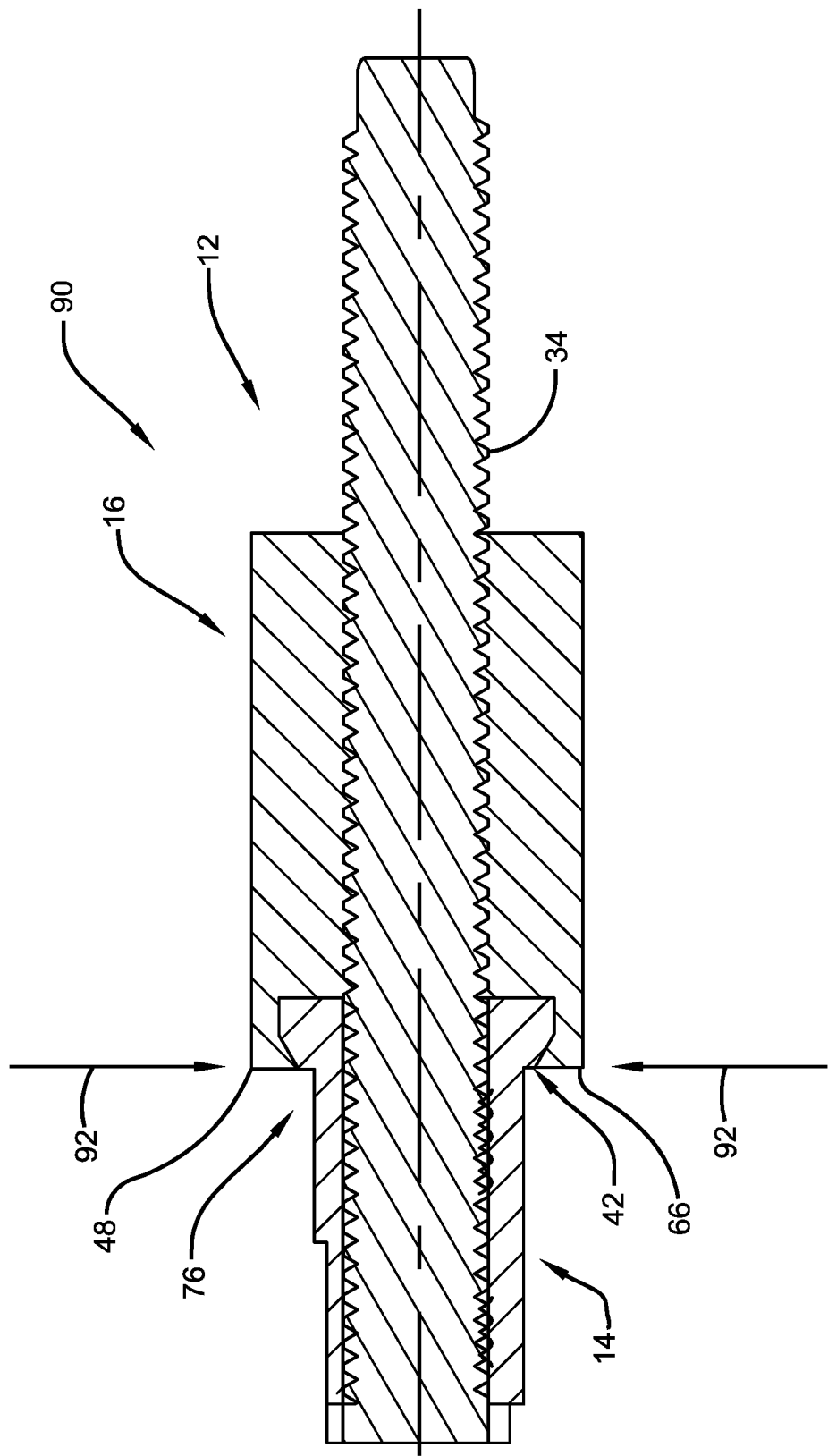
FIG. 6 is a cross-sectional view of the stud-rivet sub-assembly inserted into the spacer prior to formation of the threaded blind fastener and spacer assembly according to the concepts of the present invention.

Referring now to FIG. 6, it can be seen that the completed threaded blind fastener sub-assembly 84 is coupled to the spacer 16. In particular, the flange 42 is received in the counterbore 76. In particular, the inward chamfer 48 is sized so as to be received within the void formed by the sidewall 80. Once properly aligned, another crimping force 92 may be directed to the corner edges 70 so as to collapse the edge of the surface or surface 68 over the inward chamfer 48 to form a crimp 93 (seen in FIG. 7). In the present embodiment, the force 92 deforms a selected portion of the body to collapse around and engage the chamfer 48 which may result in portions of the flange 42 also being deformed. This process then results in the threaded blind fastener sub-assembly being radially and axially fixed to and secured within the spacer body 64. This makes for another secure fixed connection and the assembly effectively becomes a single piece indicated as the threaded blind fastener and spacer assembly 10. Skilled artisans will appreciate that the crimping force 86 and 92 may be applied simultaneously with the component pieces arranged as described above.

In another embodiment skilled artisans will appreciate that the spacer 16 may be a molded plastic material and that the tubular body 14 and/or the threaded blind fastener sub-assembly 84 may be received in the block by an insert molding operation.

Figure 7:
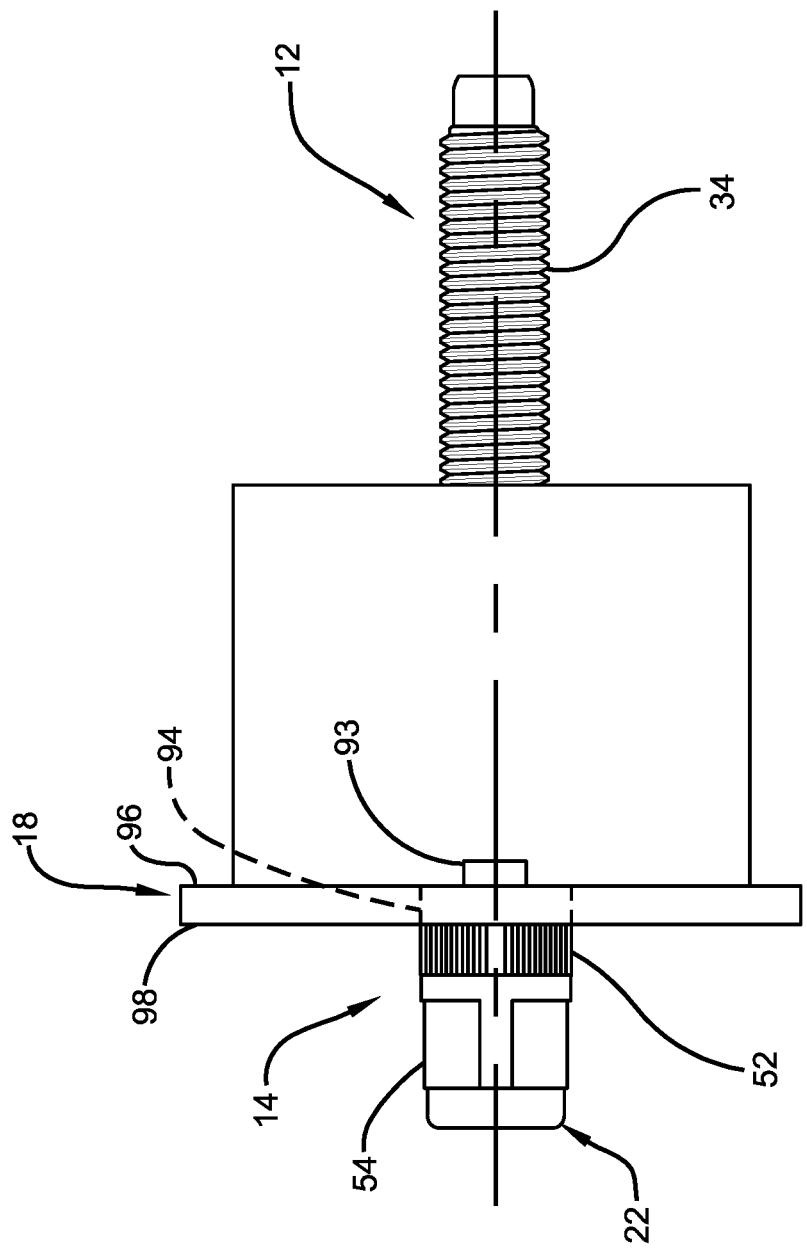
FIG. 7 is an elevational view of the threaded blind fastener and spacer assembly positioned adjacent a sheet of material according to the concepts of the present invention.

Referring now to FIGS. 1 and 7, the threaded blind fastener and spacer assembly 10 is positioned adjacent the substrate material 18 which has a hole 94 extending therethrough. In particular, the material has a spacer side 96 and an opposite side 98, which may be referred to as a blind side. As such, the assembly 10 is positioned so that the cylindrical portion 40 extends through the hole 94. In other words, the flange 42, crimp portion 54, and the collapsible portion 52 extend through the hole 94 while the spacer block surface 66 is positioned adjacent the spacer side 96. Next, as is familiar to those skilled in the art, the threaded portion 34 of the blind fastener is grasped by an appropriate tool and pulled in such a manner so as to collapse the collapsible portion 52. This forms a collapsed portion—bulbed head 52'—which secures the threaded blind fastener and spacer assembly 10 to the substrate material 18.

Such a configuration is advantageous in that the assembly 10 avoids the need to separately align each of the pieces with one another prior to the fastener connection process. This provides a robust connection and saves manufacturing expenses.

Figure 8:
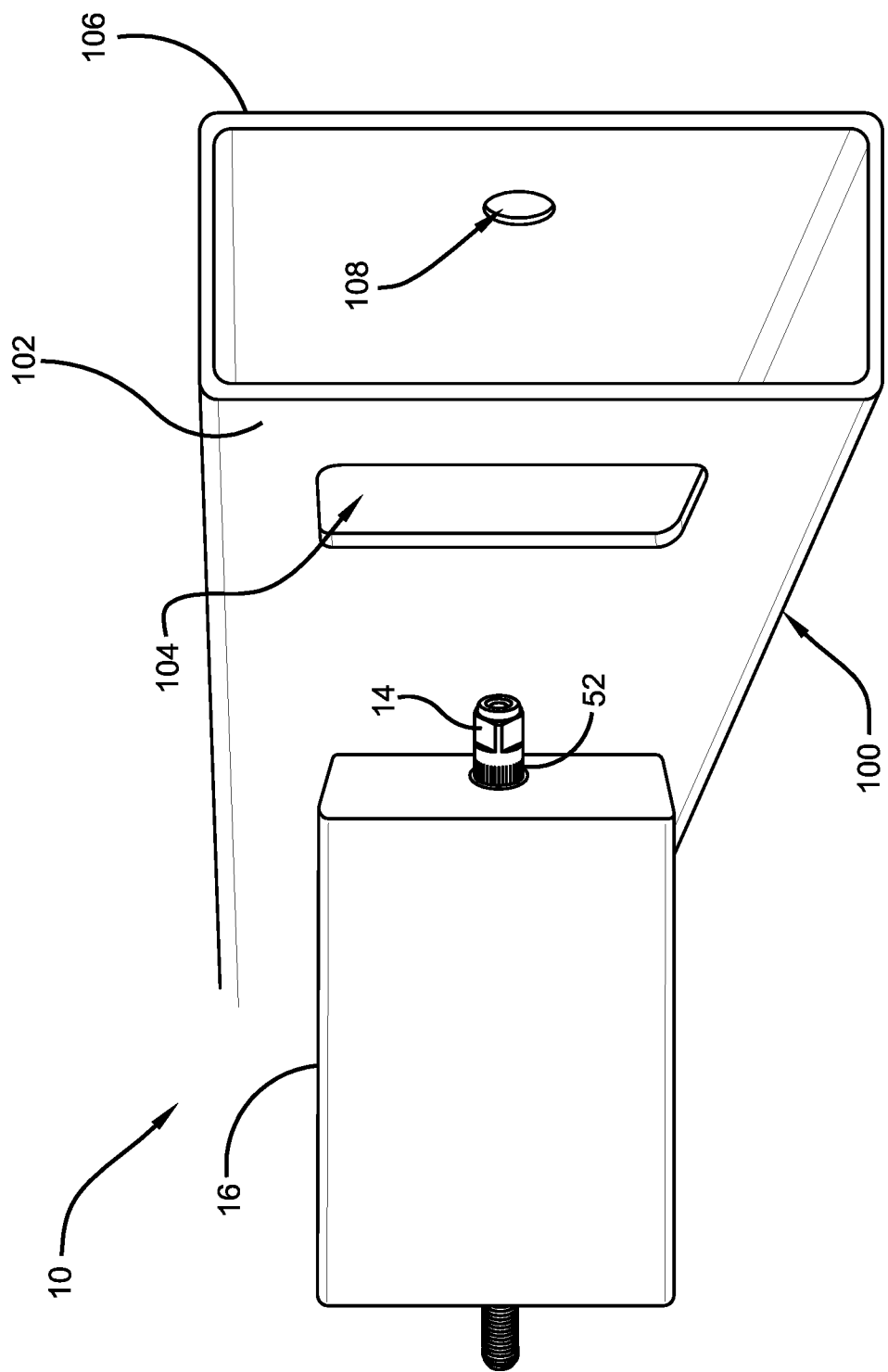
FIG. 8 is a perspective view of one application of the threaded blind fastener and spacer assembly of the present invention to add support to metal tubing.

The threaded blind fastener and spacer assembly of the present invention has many applications. Exemplary applications are portrayed in the drawings. FIG. 8 is a perspective view of one application showing the threaded blind fastener and spacer assembly 10 of the present invention to add support to square or rectangular tubing 100. The metal tubing 100 has a wall 102 with an opening 104 that is sized to receive the spacer 16 therethrough. The metal tubing has an opposed wall 106, which is substantially parallel with the wall 102, wherein the wall has an opening 108 sized to receive the tubular body 14. The walls 102 and 106 form an internal void 110 which is sized to allow movement of the spacer 16, once received therein but wherein selected surfaces of the spacer are adjacent and in slidable contact with the facing surfaces of the walls 102 and 106. After insertion of the spacer 16 into the void 110, it may be slightly rotated, for example 90°, and then the collapsible portion 52 is collapsed as described above. As a result, the assembly 10 is secured to the tubing 100 and provides internal structural support thereto.

Figure 9:
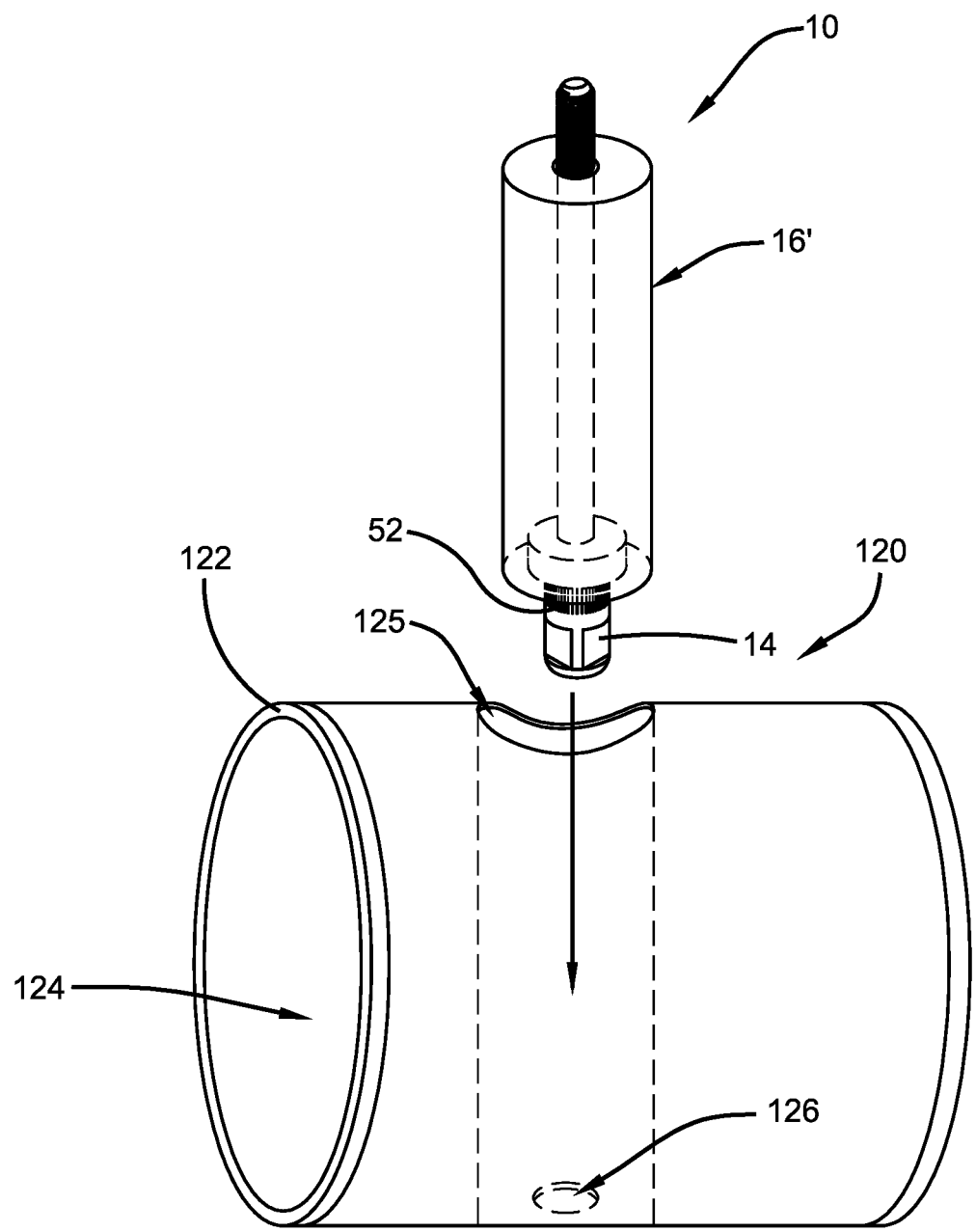
FIG. 9 is a cross-sectional view of one application of the threaded blind fastener and spacer assembly of the present invention to add support to round tubing or containers.

FIG. 9 shows another configuration of the threaded blind fastener and spacer assembly of the present invention to add support to round tubing or containers. In this embodiment, the assembly 10 employs a tubular spacer 16' for installation in a round tubular member 120 which has a wall 122 that forms an internal void 124. The tubular spacer 16' is constructed substantially the same as spacer 16 but has a cylindrical outer shape instead of a cubic shape as in the other embodiments. The wall 122 has an opening 125 on one side sized to receive the tubular spacer 16'. In a position diametrically opposite the opening 125, the wall 122 has an opening 126 sized to receive the tubular body 14. After insertion of the assembly 10 so that the spacer 16' is inside the void 124, the collapsible portion 52 is collapsed as described above on to the wall 122 around the opening 126. The length of the spacer 16' may be sized to be below, flush or extend above the wall 122 at opening 124 depending upon the particular end use of the tubular member 120.

Figure 10:
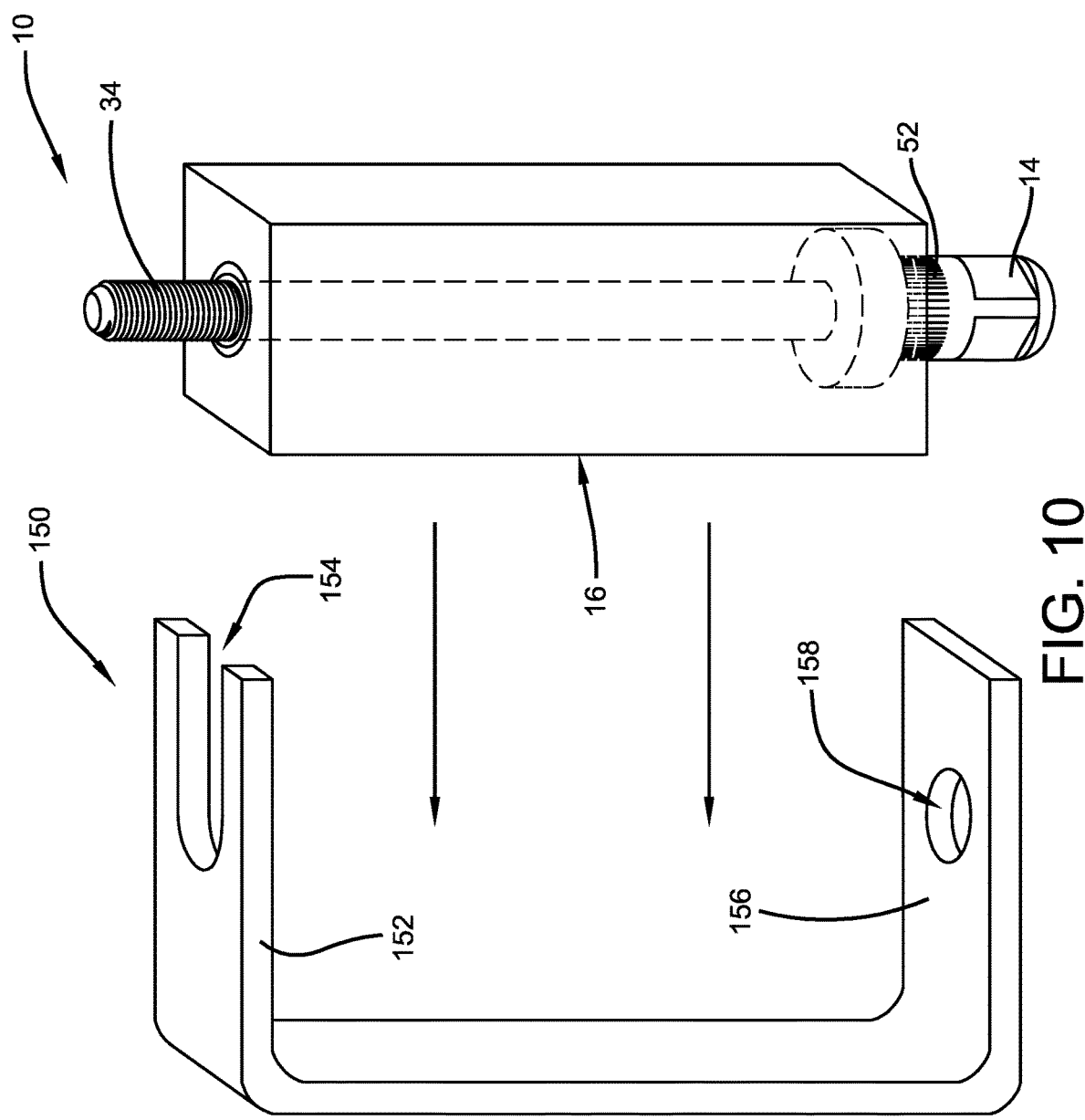
FIG. 10 is a perspective view of one application of the threaded blind fastener and spacer assembly of the present invention to add support to brackets.

FIG. 10 shows another configuration of the threaded blind fastener and spacer assembly of the present invention to add support to brackets. In this embodiment, the assembly 10 is secured to a bracket 150 which is C shaped as shown although any comparable shape could be employed. The bracket 150 provides a wall 152 which has an open slot 154 at one end and a wall 156 with an opening 158 therethrough that is aligned or juxtaposed with the slot 154. The assembly 10 is positioned within the bracket 150 or for that matter between any two opposed walls that may be connected or not so that the tubular body 14 is received through the opening 158 and the thread portion 34 is received in the slot 154. The spacer 16 may be sized to be slidably received between the walls 152 and 156 while also providing structural support to both. As in the other embodiments, the collapsible portion 52 is collapsed to secure the assembly 10 to the wall 156.

The threaded blind fastener and spacer assemblies of the present invention are useful to assemble two or more materials to one another and/or as a nut or stud secured to a material for attachment of a mating part. Therefore, the present invention provides a method for securing a threaded blind fastener and spacer assembly to a substrate material having a hole therethrough. The method includes the steps of providing a threaded blind fastener and spacer assembly as described herein, providing a substrate, partially inserting the threaded blind fastener through the substrate hole, and then collapsing the collapsible portion of the fastener to form a bulbed head that secures the substrate to the fastener flange and spacer.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A threaded blind fastener and spacer assembly comprising:
   a threaded blind fastener comprising a stem having a head at one end, and a tubular body received on said stem, said tubular body having a flange which extends radially from one end of said tubular body, wherein an end of said tubular body opposite said flange is positioned adjacent said head, said tubular body including a threaded portion and a collapsible portion; and
   a spacer having a surface, said spacer having a hole therethrough which receives said stem, said hole terminating as a counterbore at said surface, said counterbore receiving said flange.

2. The assembly according to claim 1, wherein the threaded portion of the tubular body portion is internally threaded.

3. The assembly according to claim 1, wherein said stem is a threaded mating stem that is affixed to said tubular body portion, and extends from the flange end of said tubular body portion.

4. The assembly according to claim 3, wherein said threaded mating stem is externally threaded.

5. The assembly according to claim 1, wherein said threaded blind fastener is secured to said spacer.

6. The assembly according to claim 1, wherein said flange has an inwardly extending chamfer, wherein said counterbore has a sidewall that is deformed on to said inwardly extending chamfer to secure said spacer to said threaded blind fastener.

7. A method of preparing a threaded blind fastener and spacer assembly, comprising:
   providing a threaded blind fastener having a stem with a head;
   positioning a tubular body with a flange on to said stem, said flange having an inwardly extending chamfer, wherein an end of said tubular body opposite said flange is positioned adjacent said head;
   providing a spacer having a surface, said spacer having a fastener hole therethrough, said fastener hole having a counterbore at said surface, said counterbore having a sidewall; and
   inserting said flange into said counterbore; and
   deforming said sidewall onto said inwardly extending chamfer to secure said spacer to said threaded blind fastener.

8. A method of securing a threaded blind fastener and spacer assembly to a substrate material having a hole therethrough, comprising:
   providing a threaded blind fastener and spacer assembly comprising:
      a threaded blind fastener, wherein said threaded blind fastener includes a stem having a head at one end and a tubular body with a flange, said flange having a flange diameter, wherein said tubular body includes an internally threaded portion and a collapsible portion, and wherein said flange extends radially from one end of said tubular body, wherein an end of said tubular body opposite said flange is positioned adjacent said head; and
      a spacer affixed to said threaded blind fastener, said spacer having a surface, said spacer having a hole therethrough, said hole terminating as a counterbore at said surface, said hole receiving said stem and said counterbore receiving said flange;

providing a substrate having a front side and a blind side, and having a hole therethrough, said substrate hole having a substrate hole diameter, wherein said substrate hole diameter is less than said flange diameter;

partially inserting said tubular body into said substrate hole, wherein said collapsible portion and said internally threaded portion pass through said substrate hole from said front side to said blind side, but said flange does not;

collapsing said collapsible portion to form a bulbed head adjacent to said blind side, so as to secure said substrate between said flange and said bulbed head.

* * * * *